(12) United States Patent
Minkwitz

(10) Patent No.: US 10,294,348 B2
(45) Date of Patent: May 21, 2019

(54) STABILIZED ACRYLONITRILE/STYRENE/ACRYLATE MOLDING COMPOSITIONS

(75) Inventor: Rolf Minkwitz, Dortmund (DE)

(73) Assignee: INEOS STYROLUTION EUROPE GMBH, Frankfurt am Main (DE)

( * ) Notice: Subject to any disclaimer, the term of this patent is extended or adjusted under 35 U.S.C. 154(b) by 487 days.

(21) Appl. No.: 13/169,368

(22) Filed: Jun. 27, 2011

(65) Prior Publication Data

US 2012/0046408 A1 Feb. 23, 2012

Related U.S. Application Data

(60) Provisional application No. 61/433,537, filed on Jan. 18, 2011.

(30) Foreign Application Priority Data

| Jul. 12, 2010 | (EP) | 10169243 |
| Jul. 12, 2010 | (EP) | 10169245 |
| Jul. 12, 2010 | (EP) | 10169250 |
| Jul. 12, 2010 | (EP) | 10169257 |

(51) Int. Cl.
*C08K 5/16* (2006.01)
*C08K 5/34* (2006.01)
*C08K 5/315* (2006.01)

(52) U.S. Cl.
CPC ............ *C08K 5/16* (2013.01); *C08K 5/34* (2013.01); *C08K 5/315* (2013.01)

(58) Field of Classification Search
CPC .. C08K 5/29; C08K 5/34; C08L 25/08; C08L 25/12
USPC .......................... 524/99, 100, 102
See application file for complete search history.

(56) References Cited

U.S. PATENT DOCUMENTS

| 4,224,419 | A | | 9/1980 | Swoboda et al. | |
| 4,331,586 | A | | 5/1982 | Hardy | |
| 4,396,769 | A | | 8/1983 | Ferreira et al. | |
| 4,492,791 | A | | 1/1985 | Orban et al. | |
| 4,605,699 | A | | 8/1986 | Mitulla et al. | |
| 4,634,734 | A | | 1/1987 | Hambrecht et al. | |
| 4,692,486 | A | | 9/1987 | Gugumus | |
| 4,957,953 | A | * | 9/1990 | Kikkawa et al. | 524/99 |
| 5,196,480 | A | | 3/1993 | Seitz et al. | |
| 5,208,132 | A | | 5/1993 | Kamada et al. | |
| 2003/0181583 | A1 | | 9/2003 | Duijzings et al. | |
| 2003/0225191 | A1 | | 12/2003 | Gugumus | |
| 2004/0006178 | A1 | | 1/2004 | Nagahara et al. | |

FOREIGN PATENT DOCUMENTS

| CN | 101709133 A | 5/2010 |
| DE | 1260135 B | 2/1968 |
| DE | 28 26 925 A1 | 1/1980 |
| DE | 31 49 357 A1 | 6/1983 |
| DE | 31 49 358 A1 | 6/1983 |
| DE | 3227555 A1 | 1/1984 |
| DE | 3414118 A1 | 10/1985 |
| DE | 103 16 198 A1 | 10/2003 |
| EP | 93 693 A2 | 11/1983 |
| EP | 0099532 A2 | 2/1984 |
| EP | 0450485 A2 | 10/1991 |
| EP | 534212 A1 | 3/1993 |
| EP | 535456 | 7/1993 |
| EP | 782 994 A1 | 7/1997 |
| GB | 1124911 A | 8/1968 |
| JP | 2004346237 A | 12/2004 |
| WO | WO-02/10222 A1 | 2/2002 |
| WO | WO-2008/031719 A1 | 3/2008 |

OTHER PUBLICATIONS

U.S. Appl. No. 13/169,381, Jun. 27, 2011, Minkwitz.
U.S. Appl. No. 13/169,395, Jun. 27, 2011, Minkwitz.

* cited by examiner

*Primary Examiner* — Wenwen Cai
(74) *Attorney, Agent, or Firm* — Drinker Biddle & Reath LLP

(57) ABSTRACT

The present invention relates to a thermoplastic molding composition containing:

a) from 3 to 94.6% by weight of one or more styrene copolymers as component A, b) from 5 to 95.2% by weight of one or more impact-modifying graft rubbers having no olefinic double bond in the rubber phase as component B c) from 0.2 to 0.9% by weight of a compound of the formula (I) as component C:

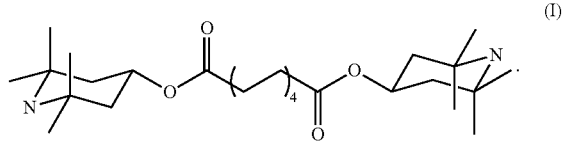

The invention also relates to a process for producing the thermoplastic molding composition and a process for producing a molding, foil, or fiber which utilizing the thermoplastic molding composition. The invention further relates to a molding, fiber, or foil made of the thermoplastic molding composition.

22 Claims, No Drawings

STABILIZED ACRYLONITRILE/STYRENE/ACRYLATE MOLDING COMPOSITIONS

RELATED APPLICATIONS

This application claims priority to European Application 10169243.2 filed on Jul. 12, 2010, European Application 10169245.7 filed on Jul. 12, 2010 European Application 10169250.7 filed on Jul. 12,2010, European Application 10169257.2 filed on Jul. 12, 2010 in European Patent Office. This Application also claims benefit of U.S. Provisional Application 61/433,537 filed on Jan. 18, 2011 which are all incorporated by reference.

The present invention relates to thermoplastic molding compositions comprising styrene copolymers and comprising impact-modifying graft rubbers having no olefinic double bond in the rubber phase.

There is a very wide variety of known stabilized thermoplastic molding compositions, and these have a wide range of possible uses because their property profile, in particular their good weathering resistance, is advantageous for many applications.

By way of example, WO-A-2008/031719 discloses stabilized molding compositions which comprise a doped $TiO_2$ alongside a graft copolymer based on (meth)acrylates or olefins. The examples of said specification use acrylate-rubber-modified vinylaromatic copolymers (known as "ASA" =acrylonitrile/styrene/acrylate), which comprise, as further stabilizers, a compound of formula (I) of the present application and a specific benzotriazole. A disadvantage of this embodiment is the reduced multiaxial toughness even prior to weathering; this decreases further as weathering progresses.

U.S. Pat. No. 4,692,486 discloses stabilizer mixtures comprising compounds of the formulae (I) and (III) of the present application for polypropylene, polyurethane, and polystyrene, where the amounts used of the individual stabilizer components are smaller than or equal to 0.1% by weight.

DE-A-103 16 198 discloses stabilizer mixtures for a very wide variety of thermoplastic polymers, an example highlighted being polypropylene. The stabilizer mixtures are three-substance mixtures. For each of the three components of said stabilizer mixture, a large number of possible generic and specific compounds are described. Just one of many possibilities described are stabilizer mixtures which also comprise compounds of the formulae (I), (II) and (III) of the present application. The amount of each of the three stabilizer components that can be present here is preferably from 0.05 to 1% by weight, based on the organic material. A disadvantage of this embodiment is the marked decrease in multiaxial toughness during weathering.

It was therefore an object of the present invention to provide improved molding compositions based on acrylonitrile/styrene/acrylate molding compositions.

Novel and improved thermoplastic molding compositions have accordingly been discovered, comprising:
a) from 3 to 94.6% by weight of one or more styrene copolymers as component A
b) from 5 to 95.2% by weight of one or more impact-modifying graft rubbers having no olefinic double bond in the rubber phase as component B
c) from 0.2 to 0.9% by weight of a compound of the formula (I) as component C:

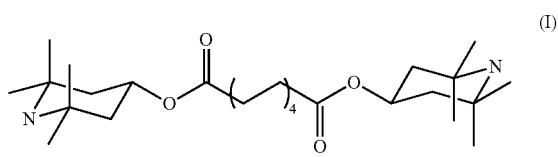

d) from 0 to 0.9% by weight of a mixture of the formula (II) as component D:

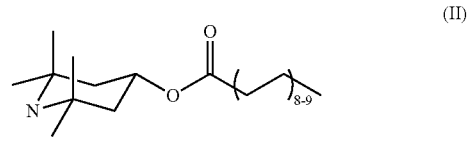

e) from 0 to 0.5% by weight of a compound of the formula (III) as component E:

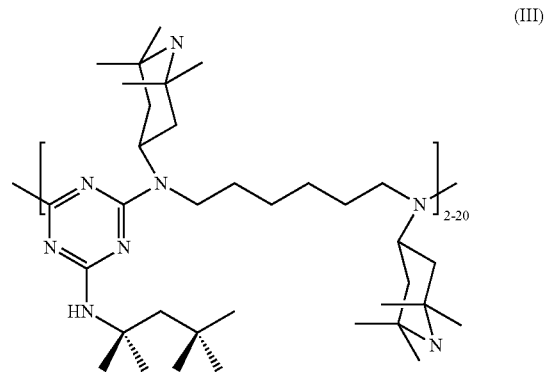

or from 0 to 0.5% by weight of a compound of the formula (IV):

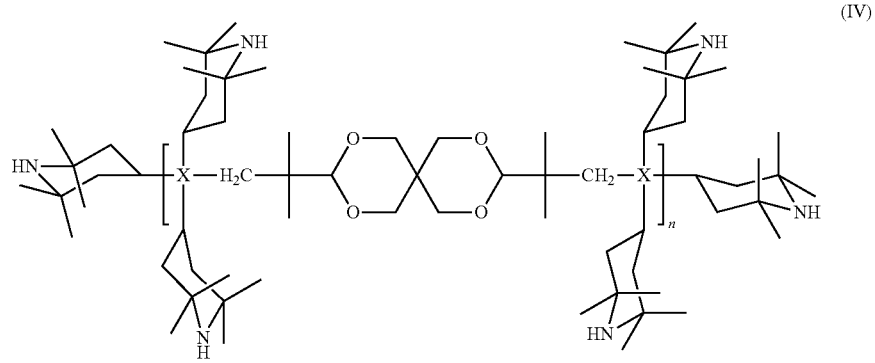

where X = 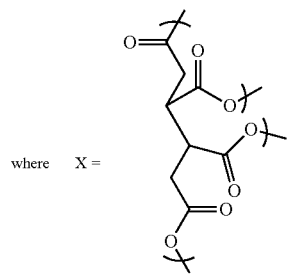

or from 0 to 0.5% by weight of a compound of the formula (V):

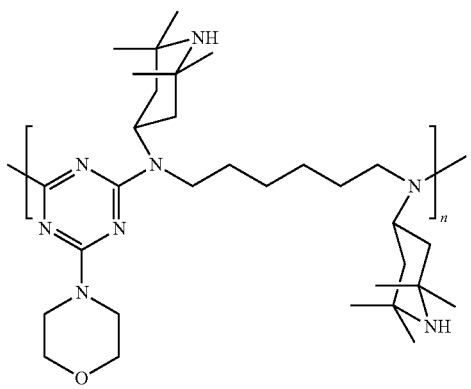

or from 0 to 0.5% by weight of a compound of the formula (VI):

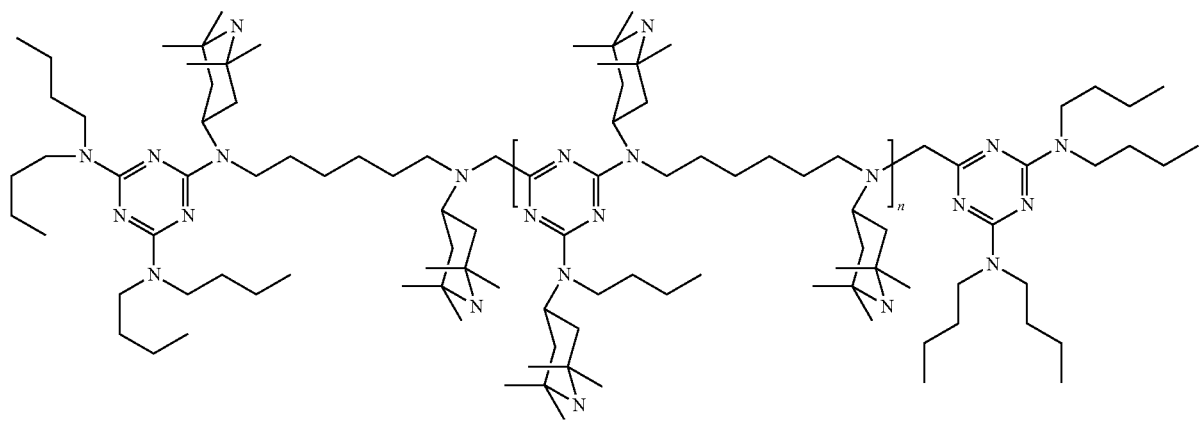

V, or VI, where each of the % by weight values is based on the sum weight of components A to G, and the sum of these values is 100% by weight.

Processes for producing said molding compositions have moreover been discovered, as also have the use thereof for producing foils, moldings, or fibers, and said foils, moldings, or fibers themselves.

By virtue of the specific selection, essential to the invention, of each individual component, and specific quantitative proportions thereof, when the molding compositions of the invention are compared with the known stabilized molding compositions they exhibit a further improvement in weathering resistance, i.e. a further improvement in resistance to heat, to light, and/or to oxygen.

A description follows of the articles, processes, and uses of the invention.

The molding compositions of the invention comprise, based on the total weight of components A, B, C, D, E, F, and G, which is 100% by weight a) from 3 to 94.6% by weight, preferably from 10 to 75% by weight, particularly preferably from 20 to 70% by weight of component A, b) from 5 to 95.2% by weight, preferably from 10 to 50% by weight, particularly preferably from 15 to 40% by weight of component B, c) from 0.2 to 0.9% by weight, preferably from 0.2 to 0.7% by weight, particularly preferably from 0.3 to 0.6% by weight of component C, d) from 0 to 0.9% by weight, preferably from 0.2 to 0.7% by weight, particularly preferably from 0.2 to 0.4% by weight of component D, with the proviso that if the amount of component D is 0% by weight (i.e. no comf) from 0 to 10% by weight of one or more additives, where these differ from components C, D, and E, as component F, and g) from 0 to 40% by weight of fibrous or particulate fillers as component G, with the proviso that if the amount of component D is 0% by weight (i.e. no component D is present), the amount of component E is from 0.01 to 0.5% by weight, preferably from 0.1 to 0.5% by weight, particularly preferably from 0.2 to 0.5% by weight, of one or more of the compounds III, IV, ponent D is present), the amount of component E is from 0.01 to 0.5% by weight, preferably from 0.1 to 0.5% by weight, particularly preferably from 0.2 to 0.5% by weight, of one of the compounds III, IV, V, or VI, e) from 0 to 0.5% by weight, preferably from 0.1 to 0.5% by weight, particularly preferably from 0.2 to 0.4% by weight of component E f) from 0 to 10% by weight, preferably from 0 to 8% by weight, particularly preferably from 0 to 5% by weight of component F, and g) from 0 to 40% by weight, preferably from 0 to 25% by weight, particularly preferably from 0 to 15% by weight of component G.

The ratio by weight of component C to component D is generally in the range from 4:1 to 0.25:1, preferably from 4:1 to 1:1, particularly preferably from 3:1 to 1:1.

The ratio by weight of component D to E is generally in the range from 2:1 to 0.5:1.

Component A:

The thermoplastic molding compositions of the invention comprise one or more styrene copolymers as component A. Any desired suitable comonomers can be present alongside styrene here in the copolymers. Preference is given to a styrene-acrylonitrile copolymer, alpha-methylstyrene-acrylonitrile copolymer, or N-phenylmaleimide-acrylonitrile copolymer.

A suitable component A is in principle any of the following that are known to the person skilled in the art and described in the literature: styrene-acrylonitrile copolymers, α-methylstyrene-acrylonitrile copolymers, N-phenylmaleimide-acrylonitrile copolymer, or a mixture of these, as long as the intrinsic viscosity IV of a mixture of these is less than or equal to 85 ml/g (measured to DIN 53727 at 25° C. on a 0.5% strength by weight solution in dimethylformamide; this measurement method also applies to all of the intrinsic viscosities IV mentioned hereinafter).

Preferred components A are composed of from 50 to 90% by weight, preferably from 60 to 80% by weight, in particular from 65 to 78% by weight, of styrene, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A, and the sum of these is 100% by weight.

Further preferred components A are composed of from 50 to 90% by weight, preferably from 60 to 80% by weight, in particular from 65 to 78% by weight, of α-methylstyrene, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A, and the sum of these is 100% by weight.

Components A to which preference is likewise given are composed of 50 to 90% by weight, preferably from 60 to 80% by weight, in particular from 65 to 78% by weight, of N-phenylmaleimide, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A, and the sum of these is 100% by weight.

Components A to which preference is likewise given are mixtures of said styrene-acrylonitrile copolymers, α-methylstyrene-acrylonitrile copolymers, and N-phenylmaleimide-acrylonitrile copolymers with each other or with polymethyl methacrylate. The polymethyl methacrylate may include from 0 to 10% by weight of alkyl or aryl methacrylate.

The abovementioned further monomers that can be used are any of the copolymerizable monomers, examples being p-methylstyrene, tert-butylstyrene, vinylnaphthalene, alkyl acrylates, and/or alkyl methacrylates, for example those having $C_1$-$C_8$-alkyl radicals, N-phenylmaleimide, or a mixture of these.

The copolymers of component A can be produced by known methods. By way of example, they can be produced via free-radical polymerization, in particular via emulsion, suspension, solution, or bulk polymerization.

Component B:

Component B comprises, and preferably consists of one or more impact-modifying graft rubbers having no olefinic double bond in the rubber phase. It involves preferably elastomeric graft copolymers of vinylaromatic compounds, in particular styrene, and of vinyl cyanides, in particular acrylonitrile, on polyalkyl acrylate rubbers. The swelling index of component B is generally from 6 to 20, preferably from 7 to 18, and particularly preferably from 7 to 15. The expression "with no olefinic double bond" means in this context that no component having an olefinic double bond is used, and that component B generally comprises from 0 to at most 0.5% by weight of olefinic double bonds, preferably from 0 to 0.2% by weight, particularly preferably from 0 to 0.1% by weight, and in particular from 0 to 0.01% by weight.

In one preferred embodiment, the elastomeric graft copolymer B is composed of $b_1$ from 1 to 99% by weight, preferably from 55 to 80% by weight, in particular from 55 to 65% by weight, of a particulate graft base B1 with a glass transition temperature below 0° C., and $b_2$ from 1 to 99% by weight, preferably from 20 to 45% by weight, in particular from 35 to 45% by weight, of a graft B2 made of the monomers, based on B.

Component B1 here is composed of $b_{11}$ from 60 to 99.99% by weight, preferably from 80 to 99.9% by weight, of at least one $C_{1-8}$-alkyl acrylate, preferably $C_{4-8}$-alkyl acrylates, in particular n-butyl acrylate and/or 2-ethyl-hexyl acrylate, as component B-11, $b_{12}$ from 0.01 to 20% by weight, preferably from 0.1 to 5% by weight, of at least one polyfunctional crosslinking monomer, preferably butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, particularly preferably diallyl phthalate, allyl methacrylate and/or dihydrodicyclopentadienyl acrylate ("DCPA"), as component B-12, and $b_{13}$ from 0 to 39.99% by weight, preferably from 0 to 19.9% by weight, of monomers that form hard polymers, e.g. vinyl acetate, (meth)acrylonitrile, styrene, substituted styrene, methyl methacrylate, or vinyl ether, as component B-13.

Component B2 here is composed of $b_{21}$ from 40 to 100% by weight, preferably from 65 to 85% by weight, of a vinylaromatic monomer, in particular of styrene, of α-methylstyrene, or of N-phenylmaleimide, as component B-21, and $b_{22}$ from 0 to 60% by weight, preferably from 15 to 35% by weight, of a polar, copolymerizable, ethylenically unsaturated monomer, in particular of acrylonitrile, (meth)acrylate, or methacrylonitrile, as component B-22.

Component B is a graft copolymer comprising a graft base B1 and at least one graft B2. The graft copolymer B can have a relatively perfect core-shell structure (graft base B1 being the core, and graft B2 being the shell), but it is also possible that the graft B2 only incompletely encloses or covers the graft base B1, or else that there is full or partial puncture of the graft B2 by the graft base B1.

In one embodiment of the invention, the graft base B1 can comprise what is known as a core which can be composed of a soft elastomeric polymer or of a hard polymer; in the embodiments in which the graft base B1 comprises a core, the core is preferably formed from a hard polymer, in particular polystyrene, or from a styrene copolymer. These graft cores and their preparation are known to the person skilled in the art and are described by way of example in EP-A 535456 and EP-A 534212.

It is, of course, also possible to use two or more graft bases B1, differing from one another by way of example in their constitution or in particle size. These mixtures of different graft bases can be prepared by methods known per se to the person skilled in the art, for example by separately preparing two or more rubber latices and mixing the corresponding dispersions, separately precipitating the moist rubbers from the corresponding dispersions and, by way of example, mixing them in an extruder, or carrying out the entire work-up of the corresponding dispersions separately and then mixing the resultant graft bases.

The graft copolymer B can have one or more further grafts or graft shells between the graft base B1 and the graft B2—for example with other monomer constitutions—but the graft copolymer B preferably has no grafts or graft shells other than the graft B2.

The glass transition temperature of the polymer of the graft base B1 is usually below 0°, preferably below (−20° C., in particular below (−30° C. A polymer composed of the monomers forming the graft B2 usually has a glass transition temperature above 30° C., in particular above 50° C. (in each case determined to DIN 53765).

The average particle size $d_{50}$ of the graft copolymers B is usually from 50 to 1200 nm, preferably from 50 to 800 nm, and particularly preferably from 50 to 600 nm. These particle sizes can be achieved by using, as graft base B1, particles whose average size $d_{50}$ is from 50 to 1000 nm, preferably from 50 to 700 nm, and particularly preferably from 50 to 500 nm. According to one embodiment of the invention, the particle size distribution is monomodal. According to another inventive embodiment, the particle size distribution of component B is bimodal, the average particle size of from 60 to 90% by weight being from 50 to 200 nm and the average particle size of from 10 to 40% by weight being from 200 to 800 nm, based on the total weight of component B. The average particle size and particle size distribution given are the sizes determined from the cumulative weight distribution. These and the other average particle sizes mentioned in the present invention are in all cases the weight average of the particle sizes, measured by HDC (W. Wohlleben and H. Schuch in Measurement of Particle Size Distribution of Polymer Latexes, 2010, editors: Luis M. Gugliotta and Jorge R. Vega, pp. 130-153).

One method for characterizing the crosslinking condition of crosslinked polymer particles is measurement of the swelling index SI, which is a measure of the solvent-swellability of a polymer having an unknown degree of crosslinking. An example of conventional swelling agent is methyl ethyl ketone or toluene. The SI of the graft copolymer B of the molding conditions of the invention is usually in the range SI=from 10 to 60. Preference is given to an SI of from 7 to 18 in toluene, particularly preferably from 7 to 15.

The graft copolymers B can be produced via graft polymerization of components B-21 and B-22 onto at least one of the graft bases B1 listed above. Suitable production processes for graft copolymers B are emulsion, solution, bulk, and suspension polymerization. The graft copolymers B are preferably produced via free-radical emulsion polymerization in the presence of latices of component B1 at temperatures of from 20 to 90° C. with use of water-soluble or oil-soluble initiators, e.g. peroxodisulfate or benzyl peroxide, or with the aid of redox initiators. Redox initiators are also suitable for the polymerization reaction below 20° C. Suitable polymerization processes are described in WO-A-02/10222, DE-A-28 26 925, DE-A-31 49 358, and DE-C 12 60 135. The grafts are preferably constructed by the emulsion polymerization process described in DE-A-32 27 555, DE-A-31 49 357, DE-A-31 49 358, and DE-A-34 14 118. The defined adjustment of the average particle sizes to from 50 to 1200 nm is preferably achieved by the processes described in DE-C-12 60 135 and DE-A 28 26 925 or in Applied Polymer Science, volume 9 (1965), page 2929. The use of polymers with different particle sizes is disclosed by way of example in DE-A-28 26 925, and U.S. Pat. No. 5 196 480.

According to the process described in DE-C-12 60 135, the graft base B1 is first prepared by polymerizing the acrylate(s) B-11 used according to one embodiment of the invention and the compound B-12 acting as crosslinking agent and/or acting as grafting agent, optionally together with the other monoethylenically unsaturated monomers B-13, in aqueous emulsion in a manner known per se at temperatures of from 20 to 100° C., preferably from 50 to 90° C. Use may be made of the usual emulsifiers, such as alkali metal alkyl- or alkylarylsulfonates, alkyl sulfates, fatty alcohol sulfonates, salts of higher fatty acids having from 10 to 30 carbon atoms, or resin soaps. It is preferable to use the sodium salts of alkylsulfonates or fatty acids having from 10 to 18 carbon atoms. According to one embodiment, the amounts used of the emulsifiers are from 0.5 to 5% by weight, in particular from 0.7 to 2% by weight, based on the monomers used in preparation of the graft base B1. Operations are generally carried out with a water:monomers ratio by weight of from 4:1 to 0.6:1. The polymerization initiators used are in particular the commonly used persulfates, such as potassium persulfate. However, it is also possible to use redox systems. The amounts generally used of the initiators are from 0.1 to 1% by weight, based on the monomers used in preparation of the graft base B1. Other polymerization auxiliaries that can be used during the polymerization reaction are the usual buffer substances which can set a preferred pH of from 6 to 9, examples being sodium bicarbonate and sodium pyrophosphate, and also from 0 to 3% by weight of a molecular weight regulator, such as mercaptans, terpinols, or dimeric α-methylstyrene. The precise polymerization conditions, in particular the nature, feed parameters, and amount of the emulsifier, are determined individually within the ranges given above in such a way that the $d_{50}$ of the resultant latex of the crosslinked acrylate polymer B1 is in the range from 50 to 1000 nm, preferably from 50 to 700 nm, particularly preferably in the range from 50 to 500 nm. The particle size distribution of the latex here is preferably to be narrow, with a polydispersity index<0.75, as in W. Mächtle and L. Börger, *Analytical Ultracentrifugation of Polymers and Nanoparticles*, (Springer, Berlin, 2006). ISBN 3-540-23432-2.

In a subsequent step, in order to prepare the graft polymer B, according to one embodiment of the invention, a monomer mixture composed of component B-21, preferably styrene, component B-22, preferably acrylonitrile and/or a (meth)acrylate, and optionally further unsaturated monomers can be polymerized in the presence of the resultant latex of the crosslinked acrylate polymer B1. The monomers B-21, B-22 and optionally further unsaturated monomers here can be added individually or in a mixture with one another. By way of example, styrene alone can first be grafted, and then a mixture composed of styrene and acrylonitrile can be grafted. It is advantageous for this graft copolymerization reaction onto the crosslinked acrylate polymer serving as the graft base to be carried out again in aqueous emulsion under the conventional conditions described above. The system in which the graft copolymerization reaction takes place can advantageously be identical with that in which the emulsion polymerization takes place for preparation of the graft base B1, and, if necessary, further emulsifier and initiator can be added here. The monomer mixture to be applied by grafting according to one embodiment of the invention can be added to the reaction mixture all at once, batchwise in two or more stages—for example to construct two or more grafts—or preferably continuously during the polymerization reaction. Conduct of the graft copolymerization reaction of the mixture of components B-21, B-22, and optionally further monomers in the presence of the crosslinking acrylate polymer B1 is such as to give a degree of grafting, in the graft copolymer B, of from 10 to 70% by weight, preferably from 20 to 60% by weight, in particular from 30 to 55% by weight, based on the total weight of component B. Because the graft yield in the graft copolymerization reaction is not 100%, the amount of the monomer mixture composed of B-21, B-22 and optionally further monomers which has to be used during the graft copolymerization reaction has to be somewhat greater than that corresponding to the desired degree of grafting. The control of the graft yield in the graft copolymerization reaction and therefore of the degree of grafting of the finished graft copolymer B is familiar to the person skilled in the art and can by way of example be achieved, inter alia, via the metering rate of the monomers or via addition of regulator (Chauvel, Daniel, ACS Polymer Preprints 15 (1974), page 329 to 333). The emulsion graft copolymerization reaction generally produces from 5 to 15% by weight, based on the graft copolymer, of free, non-grafted copolymer of components B-21, B-22, and optionally the further monomers. The method described in US-A-2004/0006178 can by way of example be used to determine the content of the graft copolymer B in the polymerization product obtained in the graft copolymerization reaction.

In other embodiments of the inventive processes, the graft base B1 can be prepared in the presence of seed particles, and/or an agglomeration step can be carried out after preparation of the graft base B1 and prior to application of the graft B2. These two process options are known to the person skilled in the art and/or are described in the literature, and are selected in order, for example, to obtain specific adjustment of particle sizes and particle size distributions.

The $d_{50}$ particle size of seed particles is generally from 10 to 200 nm, preferably from 10 to 180 nm, particularly preferably from 10 to 160 nm. The particle size distribution of the seed particles used is preferably very small. Particularly preferred seed particles among these are those whose particle size distribution is monomodal. The seed particles can in principle be composed of monomers that form elastomeric polymers, for example 1,4-butadiene, or of acrylates, or of a polymer whose glass transition temperature is more than 0° C., preferably more than 25° C. Among the preferred monomers on which these seed particles are based are vinylaromatic monomers, such as styrene, ring-substituted styrenes, or α-methylstyrene, and preference among these monomers is given to styrene, acrylonitrile, alkylacrylic acid, alkyl acrylates, and among these preferably n-butyl acrylate. It is also possible to use a mixture composed of two or more, preferably two, of the monomers mentioned. Seed particles composed of polystyrene or n-butyl acrylate are very particularly preferred. Preparation of these seed particles is known to the person skilled in the art or can be carried out by methods known per se. The seed particles are preferably obtained via particle-forming heterogeneous polymerization processes, preferably via emulsion polymerization. According to the invention, the seed particles are used as initial charge, and it is possible here to begin with separate preparation and work-up of the seed particles, and then to use them. However, it is also possible to prepare the seed particles and then, without prior work-up, to add the monomer mixture composed of B-11, B-12 and optionally B-13 to the particles.

Processes for partial or complete agglomeration of the graft base B1 are known to the person skilled in the art, or agglomeration can be undertaken by methods known per se to the person skilled in the art (see, for example, Keppler et al. Angew. Makromol. Chemie, 2, 1968 No. 20, pp. 1-25). There is in principle no restriction on the agglomeration method. By way of example, physical processes can be used, such as freeze agglomeration or pressure agglomeration processes. However, chemical methods can also be used to agglomerate the graft base. Among the latter are addition of electrolytes or of inorganic or organic acids. Preference is given to agglomeration undertaken by means of an agglomeration polymer. Examples of these are polyethylene oxide polymers, polyvinyl ethers, or polyvinyl alcohols. Among the suitable agglomeration polymers are moreover copolymers in which $C_1$-$C_{12}$-alkyl acrylates or $C_1$-$C_{12}$-methalkyl acrylates and polar comonomers, such as acrylamide, methacrylamide, ethacrylamide, n-butylacrylamide, maleamide, or (meth)acrylic acid are present. Among other monomers which can be present alongside these monomers in these copolymers are dienes, such as butadiene or isoprene. The agglomeration polymers can have a multistage structure and can have, for example, a core-shell structure. Examples of a core used are polyacrylates, such as polyethyl acrylate, and particles on (meth)alkyl acrylates and on the polar comonomers mentioned can be used as shell. Particularly preferred agglomeration polymer is a copolymer composed of from 92 to 99% by weight of ethyl acrylate or of ethyl methacrylate and from 1 to 8% by weight of (meth)acrylamide and/or (meth)acrylic acids. The agglomeration polymers are generally used in the form of a dispersion. The amount used of the agglomeration polymers in the agglomeration process, for every 100 parts by weight of the graft base, is generally from 0.1 to 5 parts by weight, preferably from 0.5 to 3 parts by weight.

The graft copolymers B of the invention can be used as they stand, as they are produced in the reaction mixture, for example in the form of latex emulsion or of latex dispersion. However, as an alternative, which is preferable for most applications, they can also be worked up in a further step. Methods of work-up are known to the person skilled in the art. One example of these is isolation of the graft copolymers B from the reaction mixture, e.g. via spray drying or shear, or via precipitation using strong acids, or by means of nucleating agents, such as inorganic compounds, e.g. magnesium sulfate. The graft copolymers B present in the reaction mixture can also be worked up by dewatering them completely or partially. Another possibility is to undertake the work-up by means of a combination of the methods mentioned.

Components A and B can be mixed in any desired manner by any of the known methods to produce the molding composition. If, by way of example, these components have been produced via emulsion polymerization, the resultant polymer dispersions can be mixed with one another, and then the polymers can be precipitated together, and the polymer mixture can be worked up. However, the blending of these components preferably takes place via extrusion, kneading, or rolling of the components together, where the components have been previously isolated, if necessary, from the aqueous dispersion or solution obtained during the polymerization reaction. The graft-copolymerization products B obtained in aqueous dispersion can also be dewatered only partially and mixed in the form of moist crumb with the hard matrix A, whereupon full drying of the graft copolymers B then takes place during the mixing process.

Component C:

A compound of the formula (I) is used as component C of the molding compositions of the invention:

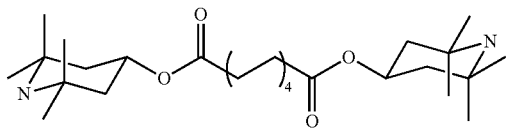
(I)

This sterically hindered amine (CAS number 52829-07-9) and production thereof are known to the person skilled in the art and described in the literature (see by way of example U.S. Pat. No. 4,396,769 and the references cited therein). It is marketed as Tinuvin® 770 by BASF SE.

Component D:

A compound of the formula (II) is used as component D of the molding compositions of the invention:

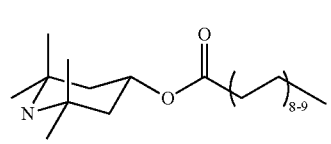
(II)

This sterically hindered amine (CAS number 167078-06-0) and production thereof are known to the person skilled in the art and described in the literature (Carlsson et al., Can. Journal of Polymer Science, Polymer Chemistry Edition (1982), 20(2), 575-82). It is marketed as Cyasorb® 3853 by Cytec Industries.

Component E:

A compound of the formula (III) can be used as component E of the molding compositions of the invention:

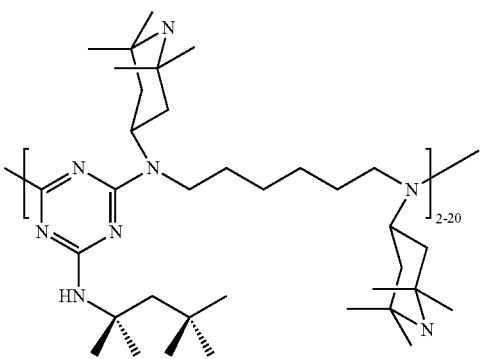
(III)

This sterically hindered amine (CAS number 71878-19-8) and production thereof are known to the person skilled in the art and are described in the literature (see by way of example EP-A-93 693 and the references cited therein). It is marketed as Chimassorb® 944 by BASF SE.

A compound of the formula (IV) can be used as further component E of the molding compositions of the invention:

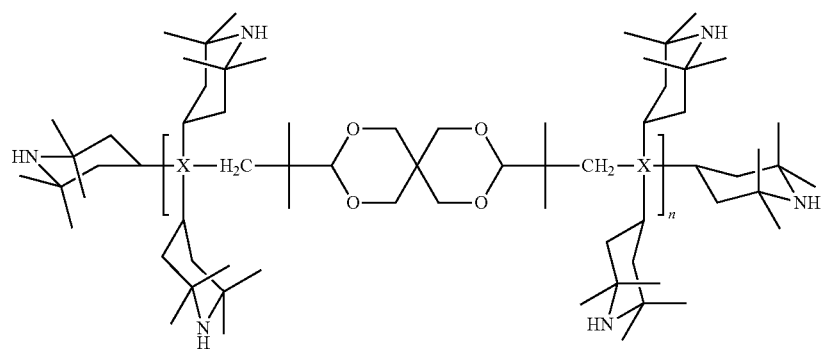
(IV)

where X =

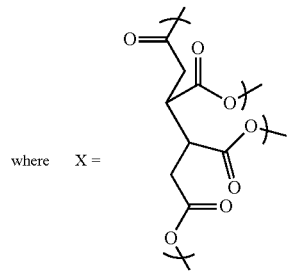

This sterically hindered amine (CAS number 101357-37-3) and production thereof are known to the person skilled in the art and are described in the literature (see by way of example U.S. Pat. No. 5,208,132 and the references cited therein). It is marketed as Adeka Stab® LA-68 by ADEKA.

A compound of the formula (V) can be used as further component E of the molding compositions of the invention:

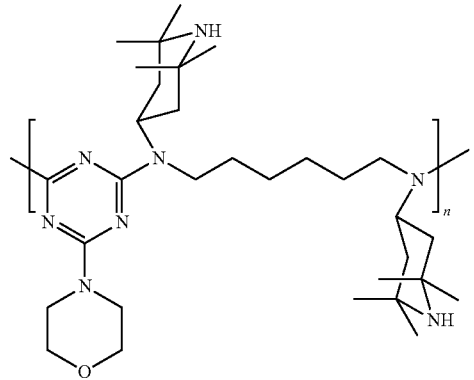

(V)

This sterically hindered amine (CAS number 82451-48-7) and production thereof are known to the person skilled in the art and are described in the literature (see by way of example U.S. Pat. No. 4,331,586 and the references cited therein). It is marketed as Cyasorb® UV-3346 by Cytec Industries.

A compound of the formula (VI) can be used as further component E of the molding compositions of the invention:

This sterically hindered amine (CAS number 192268-64-7) and production thereof are known to the person skilled in the art and are described in the literature (see by way of example EP-A-782 994 and the references cited therein). It is marketed as Chimassorb® 2020 by BASF.

Component F:

The molding compositions of the invention can comprise, alongside components A, B, C, D, and E, one or more additives which are typical for, and commonly used in, plastics mixtures, and which differ from components C, D, and E.

Examples that may be mentioned of these additives are dyes, pigments, colorants, antistatic agents, antioxidants, stabilizers for improving thermal stability, for increasing lightfastness, and for raising hydrolysis resistance and chemicals resistance, agents to counteract decomposition by heat, and in particular the lubricants which are advantageous for producing moldings. These further additives can be metered into the material at any stage of the production process, but preferably at an early juncture, in order to utilize the stabilizing effects (or other specific effects) of the additive at an early juncture. Heat stabilizers or oxidation retarders are usually metal halides (chlorides, bromides, iodides) deriving from metals of group I of the Periodic Table of the Elements (e.g. Li, Na, K, Cu).

Stabilizers suitable as component E are the conventional hindered phenols, and also "vitamin E" and compounds of analogous structure. Other suitable compounds are benzophenones, resorcinols, salicylates, benzotriazoles, and others. The amounts of these usually used (based on the total weight of the molding compositions of the invention) are usually from 0 to 2% by weight, preferably from 0.01 to 2% by weight.

(VI)

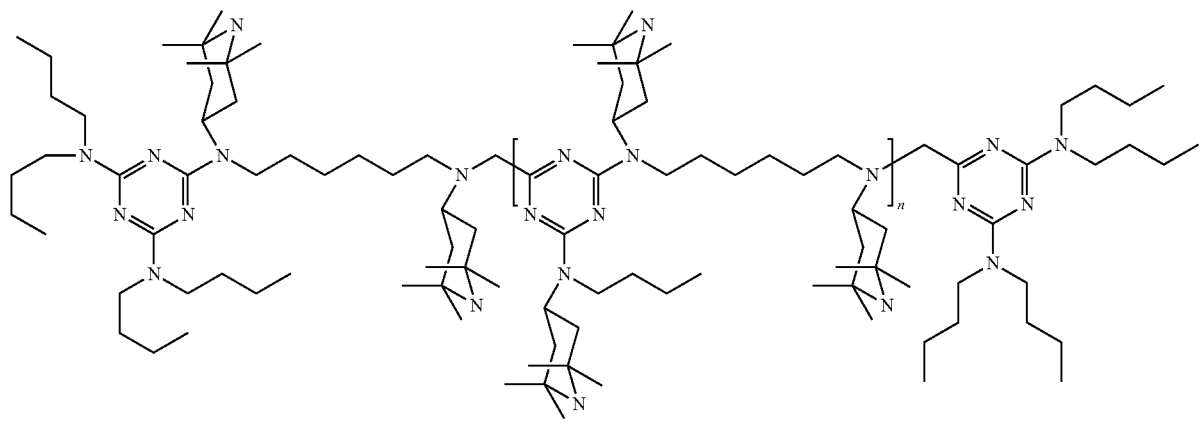

Suitable lubricants and mold-release agents are stearic acids, stearyl alcohol, stearic esters, and generally higher fatty acids, derivatives of these, and corresponding fatty acid mixtures having from 12 to 30 carbon atoms. The amounts of said additions—insofar as they are present—are in the range from 0.05 to 1% by weight (based on the total weight of the molding compositions of the invention).

Other additives that can be used are silicone oils, oligomeric isobutylene, or similar substances, and the conventional amounts—if these are present—are from 0.05 to 5% by weight (based on the total weight of the molding compositions of the invention). It is equally possible to use pigments, dyes, optical brighteners, such as ultramarine blue, phthalocyanines, titanium dioxide, cadmium sulfides, and derivatives of perylenetetracarboxylic acid.

The amounts usually used of processing aids and stabilizers, lubricants, and antistatic agents are from 0 to 2% by weight, preferably from 0.01 to 2% by weight (based on the total weight of the molding compositions of the invention).

Component G:

The molding compositions of the invention comprise, as component G, fibrous or particulate fillers which differ from components C, D, and E, or a mixture of these fillers. These are preferably commercially available products, for example carbon fibers and glass fibers. Glass fibers that can be used can be those made of E, A, or C glass, and have preferably been equipped with a size and with an adhesion promoter. Their diameter is generally from 6 to 20 μm. It is possible to use either continuous-filament fibers or chopped glass fibers (staple) or rovings with length from 1 to 10 mm, preferably from 3 to 6 mm.

It is also possible to add fillers or reinforcing materials such as glass beads, mineral fibers, whiskers, aluminum oxide fibers, mica, powdered quartz, and wollastonite.

The molding compositions of the invention can comprise further polymers alongside components A, B, C, D and optionally E and F.

The molding compositions of the invention can be produced from the components in any desired manner by any of the known methods. However, it is preferable that the components are blended by mixing in the melt, for example by extruding, kneading or rolling of the components together, e.g. at temperatures in the range from 160 to 400° C., preferably from 180 to 280° C., and in one preferred embodiment here the components have been to some extent or completely isolated in advance from the reaction mixtures obtained during the respective steps of production. By way of example, the graft copolymers B can be mixed in the form of moist crumb with granules of the vinylaromatic copolymer A, whereupon the full drying to give the graft copolymers described then takes place during the mixing process. The components can be introduced in respectively pure form into suitable mixing apparatuses, in particular extruders, preferably twin-screw extruders. However, it is also possible to begin by premixing individual components, for example A and B, and then to mix these with further components A or B or with other components, e.g. C and D. Component A here can be used in the form of component separately produced previously; however it is also possible to add the acrylate rubber and the vinylaromatic copolymer independently of one another. In one embodiment, a concentrate is first produced, for example, from components B and C in component A (these being known as additive batches or masterbatches), and is then mixed with the desired amounts of the remaining components. The molding compositions can be processed by processes known to the person skilled in the art by way of example to give granules, or else directly to give, for example, moldings.

The molding compositions of the invention can be processed to give foils, moldings or fibers. Said foils, moldings or fibers are particularly suitable for use outdoors, i.e. with exposure to weathering.

Said foils, moldings or fibers can be produced from the molding compositions of the invention by the known methods of thermoplastic processing. In particular, the production method used can be thermoforming, extrusion, injection molding, calendering, blow molding, compression molding, pressure sintering or any other type of sintering, preferably injection molding.

When the molding compositions of the invention are compared with the known stabilized molding compositions, they exhibit a further improvement in weathering resistance, i.e. a further improvement in resistance to heat, to light, and/or to oxygen.

The examples below provide further explanation of the invention.

EXAMPLES

Test Methods:

To give a measure of weathering resistance, Xenotest weathering was carried out to ISO 4892/2, Method A, external, on test specimens (60×60×2 mm, produced to ISO 294 in a mold family at a melt temperature of 260° C. and at a mold temperature of 60° C.). The surface gloss of all of the specimens was measured to DIN 67530 at an observation angle of 60° after the weathering times specified in Table 1.

Penetration (multiaxial toughness) [Nm]:

To provide a further measure of weathering resistance, the penetration value was determined to ISO 6603-2 on plaques (60×60×2 mm, produced to ISO 294 in a mold family at a melt temperature of 260° C. and at a mold temperature of 60° C.).

Starting Materials

Components or products with prefix "comp-" are not of the invention and serve for comparison.

Components A and B (and comp-A for comparison) used were:

AB-i: an acrylate-rubber-modified styrene-acrylonitrile copolymer (ASA), the synthesis of which has been described as example of the invention in EP-A-450 485, where the amount of component A of EP-A-450 485 present is 25 parts, the amount of component BI is 10 parts, and the amount of component C present is correspondingly 65 parts. Component A was synthesized by using 2 parts of dihydrodicyclopentadienyl acrylate (CAS number 12542-30-2) instead of 1.6 parts of tricyclodecenyl acrylate, and component BI was also synthesized by using 2 parts of dihydrodicyclopentadienyl acrylate instead of 1.0 part of tricyclodecenyl acrylate. The resultant swelling indices were 11.6 for A and 13.6 for BI in toluene, and the resultant average particle size $d_{50}$ was 93 nm for A and 443 nm for BI.

AB-ii: an acrylate-rubber-modified styrene-acrylonitrile copolymer (ASA), the synthesis of which has been described as example of the invention in EP-A-450 485, where the amount of component BI of EP-A-450 485 present is 30 parts and the amount of component C is accordingly 70 parts. Component B was synthesized by using 5 parts of dihydrodicyclopentadienyl acrylate (CAS number 12542-30-2) instead of 1.6 parts or 1.0 part of tricyclodecenyl acrylate. The resultant swelling index was 5.9 for BI in toluene, with an average particle size $d_{50}$ of 653 nm.

comp-AB-iii: a molding composition different from AB-i, where 35 parts of an acrylate-styrene-acrylonitrile (ASA) graft polymer with an average particle size $d_{50}$ of 1207 nm and with a swelling index of 9.1 are present in dispersion in a styrene-acrylonitrile copolymer with MW 104 000.

comp-AB-iv: a polypropylene commercially available from LyondellBasell Industries AF S.C.A. as Moplen® EP240P.

comp-AB-v: a polystyrene marketed by BASF SE as polystyrene 158K.

Component C (and comp-C for comparison) used was:

C-i: a compound of the formula (I), marketed by BASF SE as Tinuvin® 770.

comp-C-ii: a compound of the formula (VII), marketed by BASF SE as Tinuvin® 765.

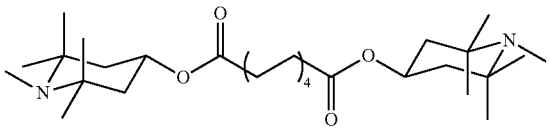

Component D (and comp-D for comparison) used was:

D-i: a compound of the formula (II), marketed by Cytec Industries as Cyasorb® 3853.

Component E (and comp-E for comparison) used was:

E-i: a compound of the formula (III), marketed by BASF SE as Chimassorb® 944.

E-ii: a compound of the formula (V), marketed by Cytec Industries as Cyasorb® UV-3346.

comp-E-iiii: a high-molecular-weight sterically hindered amine of the formula (VIII), CAS number 106990-43-6, marketed by SABO S.p.A. as Sabostab® 119.

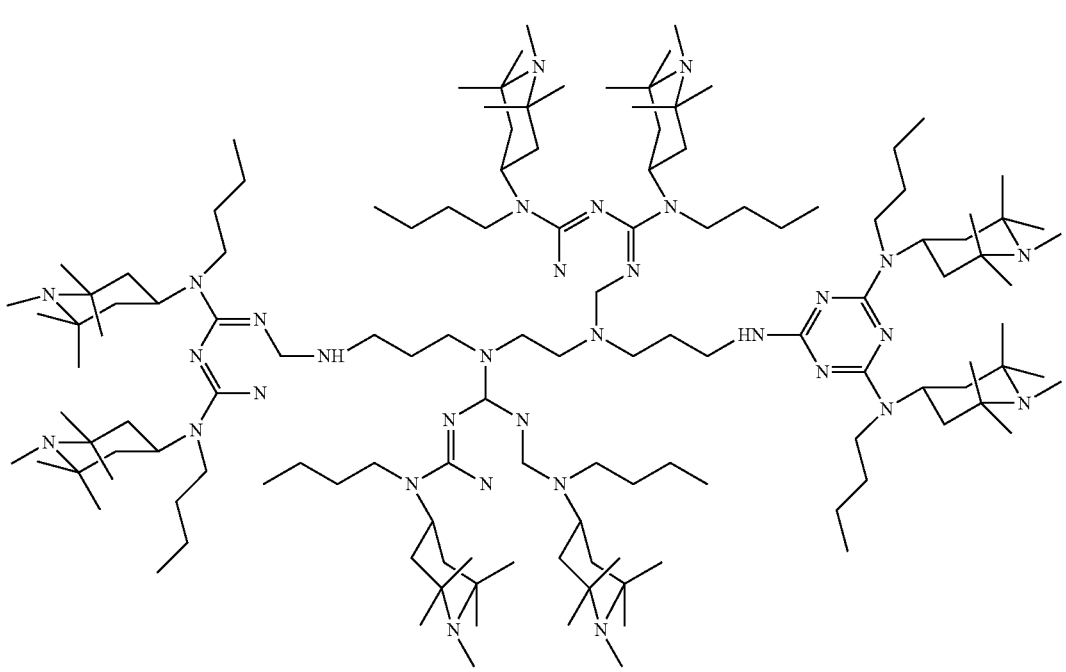

Component F (and comp-F for comparison) used was:

F-i: Black Pearls 880 carbon black, marketed by Cabot Corporation

Production of the molding compositions and moldings:

Components A, B, C, and D (see Table 1 for respective parts by weight) were homogenized in a ZSK30 twin-screw extruder from Werner & Pfleiderer at 250° C., and extruded into a water bath. The extrudates were granulated and dried. The granules were used in an injection-molding machine at a melt temperature of 260° C. and a mold surface temperature of 60° C. to produce test specimens, and the properties specified in Table 1 were determined.

TABLE 1

Constitution and properties of molding compositions (prefix comp: for comparison)

| | Example | | | | | | | | | |
|---|---|---|---|---|---|---|---|---|---|---|
| | 1 | 2 | 3 | comp-4 | comp-5 | comp-6 | comp-7 | comp-8 | comp-9 | comp-10 |
| Constitution | | | | | | | | | | |
| AB-i | 98 | 98 | 98 | — | — | — | — | — | 98 | 98 |
| comp-AB-ii | — | — | — | 98 | — | — | — | — | — | — |
| comp-AB-iii | — | — | — | — | 98 | — | — | — | — | — |
| comp-AB-iv | — | — | — | — | — | 98.8 | — | — | — | — |
| comp-AB-v | — | — | — | — | — | — | 98.75 | 98 | — | — |
| C-i | 0.5 | 0.5 | 0.5 | 0.5 | 0.5 | 0.05 | 0.05 | 0.5 | 0 | 0.5 |
| comp-C-ii | — | — | — | — | — | — | — | — | 0.5 | — |
| D-i | 0.5 | 0.25 | 0.25 | 0.25 | 0.25 | 0.05 | 0.1 | 0.25 | 0.5 | — |
| E-i | — | 0.25 | — | — | 0.25 | 0.1 | 0.1 | 0.25 | — | — |
| E-ii | — | — | 0.25 | 0.25 | — | — | — | — | — | — |
| comp-E-iii | — | — | — | — | — | — | — | — | — | 0.5 |
| F-i | 1 | 1 | 1 | 1 | 1 | 1 | 1 | 1 | 1 | 1 |
| Properties | | | | | | | | | | |
| Gloss after | | | | | | | | | | |
| 0 h of WT | 96 | 97 | 99 | 97 | 85 | 97 | 102 | 101 | 96 | 95 |
| 1500 h of WT | 84 | 88 | 85 | 78 | 69 | 82 | 2 | 4 | 62 | 65 |
| 2500 h of WT | 78 | 82 | 81 | 62 | 54 | 68 | 0.5 | 0.7 | 23 | 34 |
| Penetration after | | | | | | | | | | |
| 0 h of WT | 30.2 | 29.7 | 29.8 | 8.3 | 29.3 | 4.1 | 1.1 | 1.3 | 31.3 | 31.7 |
| 1500 h of WT | 11.7 | 13.4 | 12.6 | 2 | 5.1 | 1.4 | 0.5 | 0.8 | 4.7 | 7.9 |
| 2500 h of WT | 7.3 | 8.5 | 8.4 | 0.5 | 0.4 | 1.1 | 0.3 | 0.4 | 3.3 | 4.5 |

The examples provide evidence that when the molding compositions of the invention are compared with the known stabilized molding compositions they exhibit a further improvement in weathering resistance, i.e. a further improvement in resistance to heat, to light, and/or to oxygen. Constitution has been given in parts by weight, and the abbreviation WT means weathering time.

The invention claimed is:

1. A thermoplastic molding composition consisting essentially of:
   a) 63.7% by weight of one or more styrene copolymers as component A, wherein component A is a styrene-acrylonitrile copolymer composed of 65% by weight styrene and 35% by weight of acrylonitrile,
   b1) 24.5% by weight of one or more impact-modifying graft rubbers having no olefinic double bond in the rubber phase as component B, wherein component B is an acrylate-styrene-acrylonitrile (ASA) graft polymer with an average particle diameter of 93 nm, and which comprises from 55 to 80% by weight, based on B, of an elastomerically crosslinked acrylate polymer B1, and from 45 to 20% by weight, based on B, of a graft shell B2 made of styrene and acrylonitrile monomer, wherein component B has a swelling index of 11.6, and wherein the component B1 is composed of
      b11 from 80 to 99.9% by weight, of n-butyl acrylate, and
      b12 from 0.1 to 5% by weight of dihydrodicyclopentadienyl acrylate;
   b2) 9.8% by weight of one or more impact-modifying graft rubbers having no olefinic double bond in the rubber phase as component BB, wherein component BB is an acrylate-styrene-acrylonitrile (ASA) graft polymer with an average particle diameter of 443 nm, and which comprises from 55 to 80% by weight, based on BB, of an elastomerically crosslinked acrylate polymer BB1, and from 45 to 20% by weight, based on BB, of a graft shell BB2 made of styrene and acrylonitrile monomer, wherein component BB has a swelling index of 13.6, and wherein the component BB1 is composed of
      bb11 from 80 to 99.9% by weight, of n-butyl acrylate, and
      bb12 from 0.1 to 5% by weight, of dihydrodicyclopentadienyl acrylate,
   c) from 0.3 to 0.6% by weight of a compound of the formula (I) as component C:

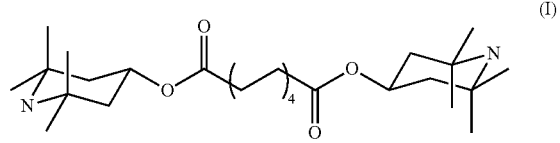

(I)

d) from 0.2 to 0.7% by weight of a mixture of the formula (II) as component D:

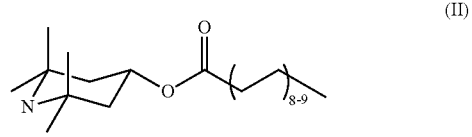

(II)

e) from 0 to 0.5% by weight of a compound of the formula (III) as component E:

(III)

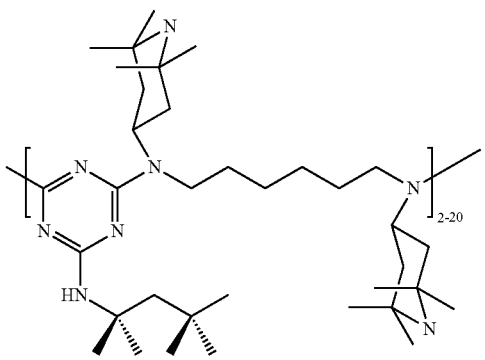

or from 0 to 0.5% by weight of a compound of the formula (V):

(V)

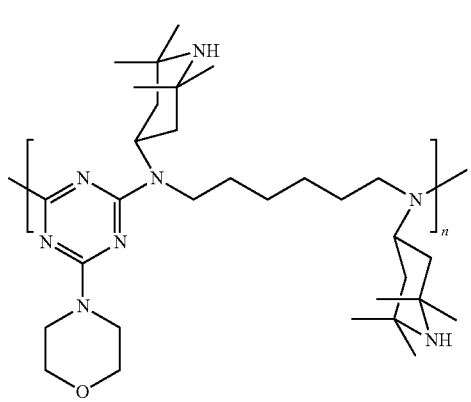

f) from 0 to 2% by weight of one or more additives selected from the group consisting of dyes, pigments, colorants, antistatic agents, antioxidants, stabilizers for improving thermal stability, for increasing lightfastness, for raising hydrolysis resistance and chemical resistance, agents to counteract decomposition by heat, lubricants, mold release agents, silicone oils, oligomeric isobutylene, where these differ from components C, D, and E, as component F, and g) from 0 to 40% by weight of fibrous or particulate fillers as component G selected from the group consisting of carbon fibers, glass fibers, glass beads, mineral fibers, whiskers, aluminum oxide fibers, mica, powdered quartz, and wollastonite, wherein the ratio by weight of component C to component D is in the range from 3:1 to 1:1 and where each of the % by weight values is based on the sum weight of components A, B, BB, C, D, E, F, and G, and the sum of these values does not exceed 100% by weight, and the thermoplastic molding has a penetration (Nm) as determined in accordance with ISO 6603-2 on plaques (60×60×2 mm), produced to ISO 294 in a mold family at a melt temperature of 260° C. and at a mold temperature of 60° C., after a weathering time of 1500 hrs, of from 11.7 to 13.4.

2. The thermoplastic molding composition according to claim 1 which uses components C and D in a ratio by weight of from 3:1 to 1:1 and components D and E in a ratio by weight of from 2:1 to 0.5:1.

3. The thermoplastic molding composition according to claim 1, wherein component F is present in an amount of from 0.01 to 2% by weight, and wherein component F is one or more lubricants.

4. The thermoplastic molding composition according to claim 1, wherein the thermoplastic molding exhibits a decrease in penetration (Nm) of from 55% to 61% from its initial value after 1500 hrs of weathering.

5. The thermoplastic molding composition according to claim 1, wherein the penetration (Nm) of the thermoplastic molding after a weathering time of 2500 hrs is from 7.3 to 8.5.

6. The thermoplastic molding composition according to claim 1, wherein the thermoplastic molding composition contains no titanium dioxide.

7. The thermoplastic molding composition according to claim 1, wherein the ratio by weight of component C to component D is in the range from 2:1 to 1:1.

8. A process for producing the thermoplastic molding composition according to claim 1, which comprises mixing components A, B, BB, C, D, E, and F with one another at temperatures of from 100 to 300° C. and at a pressure of from 1 to 50 bar in any sequence, and then kneading and extruding the material.

9. The process for producing the thermoplastic molding composition according to claim 1, which comprises premixing a portion of component B with a portion of component A to give a masterbatch in a ratio of from 1:1 to 1:2, and then the material is mixed with further components A, B, BB, C, D, E, and F to give the thermoplastic molding composition.

10. A process for producing a molding, foil, or fiber which comprises utilizing the thermoplastic molding composition according to claim 1.

11. A molding, fiber, or foil made of the thermoplastic molding composition according to claim 1.

12. A thermoplastic molding composition consisting essentially of:
a) 63.7% by weight of one or more styrene copolymers as component A, wherein component A is a styrene-acrylonitrile copolymer composed of 65% by weight styrene and 35% by weight of acrylonitrile,
b1) 24.5% by weight of one or more impact-modifying graft rubbers having no olefinic double bond in the rubber phase as component B, wherein component B is an acrylate-styrene-acrylonitrile (ASA) graft polymer with an average particle diameter of from 93 nm, and which comprises from 55 to 80% by weight, based on B, of an elastomerically crosslinked acrylate polymer B1, and from 45 to 20% by weight, based on B, of a graft shell B2 made of styrene and acrylonitrile monomer, wherein component B has a swelling index of 11.6, and wherein the component B1 is composed of
b11 from 80 to 99.9% by weight, of n-butyl acrylate, and
b12 from 0.1 to 5% by weight, of dihydrodicyclopentadienyl acrylate,
b2) 9.8% by weight of one or more impact-modifying graft rubbers having no olefinic double bond in the rubber phase as component BB, wherein component BB is an acrylate-styrene-acrylonitrile (ASA) graft polymer with an average particle diameter of 443 nm, and which comprises from 55 to 80% by weight, based on BB, of an elastomerically crosslinked acrylate polymer BB1, and from 45 to 20% by weight, based on BB, of a graft shell BB2 made of styrene and acrylonitrile monomer, wherein component BB has a swelling index of 13.6, and wherein the component BB1 is composed of
bb11 from 80 to 99.9% by weight, of n-butyl acrylate, and
bb12 from 0.1 to 5% by weight, of dihydrodicyclopentadienyl acrylate,
c) 0.5% by weight of a compound of the formula (I) as component C:

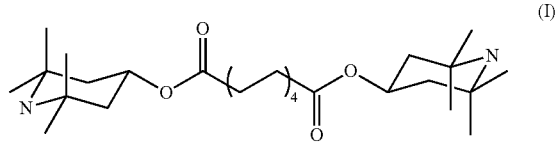

d) 0.5% by weight of a mixture of the formula (II) as component D:

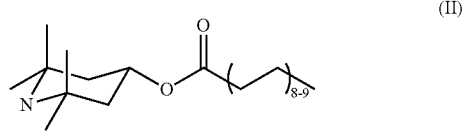

f) 1% by weight of one or more additives, selected from the group consisting of dyes, pigments, colorants, antistatic agents, antioxidants, stabilizers for improving thermal stability, for increasing lightfastness, for raising hydrolysis resistance and chemical resistance, agents to counteract decomposition by heat, lubricants, mold release agents, silicone oils, oligomeric isobutylene, where these differ from components C, and D as component F,
wherein the ratio by weight of component C to component D is in the range from 3:1 to 1:1 and where each of the % by weight values is based on the sum weight of components A, B, BB, C, D, E, and F, and the sum of these values does not exceed 100% by weight, and the thermoplastic molding has a penetration (Nm) as determined in accordance with ISO 6603-2 on plaques (60×60×2 mm), produced to ISO 294 in a mold family at a melt temperature of 260° C. and at a mold temperature of 60° C., after a weathering time of 1500 hrs, of from 11.7 to 13.4.

13. A thermoplastic molding composition consisting essentially of:
a) 63.7% by weight of one or more styrene copolymers as component A, wherein component A is a styrene-acrylonitrile copolymer composed of 65% by weight styrene and 35% by weight of acrylonitrile,
b1) 24.5% by weight of one or more impact-modifying graft rubbers having no olefinic double bond in the rubber phase as component B, wherein component B is an acrylate-styrene-acrylonitrile (ASA) graft polymer with an average particle diameter of from 93 nm, and which comprises from 55 to 80% by weight, based on B, of an elastomerically crosslinked acrylate polymer B 1, and from 45 to 20% by weight, based on B, of a graft shell B2 made of styrene and acrylonitrile monomer, wherein component B has a swelling index of 11.6, and wherein the component B1 is composed of
b11 from 80 to 99.9% by weight, of n-butyl acrylate, and
b12 from 0.1 to 5% by weight, of dihydrodicyclopentadienyl acrylate,
b2) 9.8% by weight of one or more impact-modifying graft rubbers having no olefinic double bond in the rubber phase as component BB, wherein component BB is an acrylate-styrene-acrylonitrile (ASA) graft polymer with an average particle diameter of 443 nm, and which comprises from 55 to 80% by weight, based on BB, of an elastomerically crosslinked acrylate polymer BB1, and from 45 to 20% by weight, based on BB, of a graft shell BB2 made of styrene and acrylonitrile monomer, wherein component BB has a swelling index of 13.6, and wherein the component BB1 is composed of
bb11 from 80 to 99.9% by weight, of n-butyl acrylate, and
bb12 from 0.1 to 5% by weight, of dihydrodicyclopentadienyl acrylate,
c) 0.5% by weight of a compound of the formula (I) as component C: t,?
d) 0.25% by weight of a mixture of the formula (II) as component D: t,?
e) 0.25% by weight of a compound of the formula (III) as component E: t,?
or 0.25% by weight of a compound of the formula (V): t,?
f) 1% by weight of one or more additives, selected from the group consisting of dyes, pigments, colorants, antistatic agents, antioxidants, stabilizers for improving thermal stability, for increasing lightfastness for raising hydrolysis resistance and chemical resistance, agents to counteract decomposition by heat, lubricants, mold release agents, silicone oils, oligomeric isobutylene, where these differ from components C, D, and E, as component F,
wherein the ratio by weight of component C to component D is in the range from 3:1 to 1:1 and where each of the % by weight values is based on the sum weight of components A, B, BB, C, D, E, and F, and the sum of these values does not exceed 100% by weight, and the thermoplastic molding has a penetration (Nm) as determined in accordance with ISO 6603-2 on plaques (60×60×2 mm), produced to ISO 294 in a mold family at a melt temperature of 260° C. and at a mold temperature of 60° C., after a weathering time of 1500 hrs, of from 11.7 to 13.4.

14. Thermoplastic molding composition according to claim 1, wherein the one or more additive f) is selected from the group consisting of dyes, pigments, and colorants.

15. Thermoplastic molding composition according to claim 12, wherein the one or more additive f) is selected from the group consisting of dyes, pigments, and colorants.

16. Thermoplastic molding composition according to claim 13, wherein the one or more additive f) is selected from the group consisting of dyes, pigments, and colorants.

17. Thermoplastic molding composition according to claim 1, wherein the one or more additive f) is carbon black.

18. Thermoplastic molding composition according to claim 12, wherein the one or more additive f) is carbon black.

19. Thermoplastic molding composition according to claim 13, wherein the one or more additive f) is carbon black.

20. Thermoplastic molding composition according to claim 1, wherein the component B1 of acrylate-styrene-acrylonitrile (ASA) graft polymer b1) is composed of b11 88% by weight, of n-butyl acrylate, and
b12 2% by weight, of dihydrodicyclopentadienyl acrylate,
and wherein the component BB1 of acrylate-styrene-acrylonitrile (ASA) graft polymer b2 )is composed of
  bb11 88% by weight, of n-butyl acrylate, and
  b12 2% by weight, of dihydrodicyclopentadienyl acrylate.

21. Thermoplastic molding composition according to claim 12, wherein the component B1 of acrylate-styrene-acrylonitrile (ASA) graft polymer b1) is composed of
  b11 88% by weight, of n-butyl acrylate, and
  b12 2% by weight, of dihydrodicyclopentadienyl acrylate,
and wherein the component BB1 of acrylate-styrene-acrylonitrile (ASA) graft polymer b2) is composed of
  bb11 88% by weight, of n-butyl acrylate, and
  bb12 2% by weight, of dihydrodicyclopentadienyl acrylate.

22. Thermoplastic molding composition according to claim 13, wherein the component B1 of acrylate-styrene-acrylonitrile (ASA) graft polymer b1) is composed of
  b11 88% by weight, of n-butyl acrylate, and
  b12 2% by weight, of dihydrodicyclopentadienyl acrylate,
and wherein the component BB1 of acrylate-styrene-acrylonitrile (ASA) graft polymer b2) is composed of
  bb11 88% by weight, of n-butyl acrylate, and
  bb12 2% by weight, of dihydrodicyclopentadienyl acrylate.

* * * * *